United States Patent
Yamaguchi et al.

[19]

[11] Patent Number: 6,063,888

[45] Date of Patent: May 16, 2000

[54] LIQUID CURABLE RESIN COMPOSITION

[75] Inventors: Yoshikazu Yamaguchi, Tsukuba; Junji Yoshizawa, Tsuchiura; Zen Komiya, Tsukuba; Takashi Ukachi, Ushiko, all of Japan

[73] Assignees: DSM N.V., Heerlen, Netherlands; JSR Corporation, Tokyo, Japan

[21] Appl. No.: 09/168,938

[22] Filed: Oct. 9, 1998

Related U.S. Application Data

[63] Continuation of application No. PCT/NL97/00176, Apr. 9, 1997.

[30] Foreign Application Priority Data

Apr. 9, 1996 [JP] Japan ..................... 8-086092

[51] Int. Cl.[7] ..................... C08G 77/20; C08F 2/46
[52] U.S. Cl. ..................... 528/32; 522/99; 522/96; 522/172; 428/380; 428/391; 428/403; 428/405; 428/407
[58] Field of Search ..................... 522/99, 148, 172, 522/96, 91; 528/32; 428/380, 391, 403, 405, 407

[56] References Cited

U.S. PATENT DOCUMENTS

| | | | |
|---|---|---|---|
| 4,130,708 | 12/1978 | Friedlander et al. | 528/28 |
| 4,259,467 | 3/1981 | Keogh et al. | 526/279 |
| 4,260,725 | 4/1981 | Keogh et al. | |
| 4,472,021 | 9/1984 | Ansel et al. | 385/141 |
| 4,496,210 | 1/1985 | Ansel et al. | 385/128 |
| 4,605,712 | 8/1986 | Mueller et al. | 525/474 |
| 4,632,968 | 12/1986 | Yokota et al. | 526/279 |
| 5,034,461 | 7/1991 | Lai et al. | 525/100 |
| 5,128,391 | 7/1992 | Shustack | 522/92 |
| 5,489,622 | 2/1996 | Hara et al. | 522/99 |
| 5,502,145 | 3/1996 | Szum | 528/28 |
| 5,514,730 | 5/1996 | Mazurek et al. | 522/99 |
| 5,527,578 | 6/1996 | Mazurek et al. | 428/41.8 |
| 5,664,041 | 9/1997 | Szum | 385/128 |
| 5,696,179 | 12/1997 | Chawla | 522/90 |
| 5,750,588 | 5/1998 | Takeoka et al. | 522/66 |
| 5,789,461 | 8/1998 | Nicolson et al. | 523/106 |
| 5,849,811 | 12/1998 | Nicolson et al. | 523/106 |
| 5,908,873 | 6/1999 | Shustack | 522/39 |

FOREIGN PATENT DOCUMENTS

| | | |
|---|---|---|
| 116 140 | 8/1984 | European Pat. Off. . |
| 565 798 | 10/1993 | European Pat. Off. . |
| 780712 | 6/1997 | European Pat. Off. . |
| 96/11217 | 4/1996 | WIPO . |
| 96/11965 | 4/1996 | WIPO . |
| 98/21157 | 5/1998 | WIPO . |

*Primary Examiner*—James J. Seidleck
*Assistant Examiner*—Sanza L. McClendon
*Attorney, Agent, or Firm*—Pillsbury Madison & Sutro

[57] ABSTRACT

A liquid radiation curable resin composition comprising a polydimethylsiloxane compound which has (i) at least two urethane bonds in one molecule, (ii) an unreactive organic group at at least one of the ends of the molecule, and (iii) a radical curable ethylenically unsaturated group at the other end of the molecule. The resin composition exhibits superior shelf life in a liquid state and produces cured products having slippery surface. It is suitable as a coating material for optical fibers.

16 Claims, No Drawings

6,063,888

LIQUID CURABLE RESIN COMPOSITION

This is a Continuation of International Application No. PCT/NL97/00176 filed Apr. 9, 1997 which designated in the U.S.

BACKGROUND OF THE INVENTION

1. Field of the Invention

The present invention relates to a liquid curable resin composition producing cured products with slippery surface, and more particularly, to a liquid curable resin composition suitable for use as a coating material for optical fiber ribbon matrix and the like.

2. Description of Related Art

In the production of optical fibers, a resin coating is provided for protection and reinforcement immediately after spinning molten glass fibers. A known structure of the resin coating consists of a primary coating layer of a flexible resin which is coated on the surface of optical fibers and a secondary coating layer of a rigid resin which is provided over the primary coating layer. A so-called optical fiber ribbon is known in the art in the application of optical fibers provided with resin coating. The optical fiber ribbon is made from several elemental optical fibers, e.g. two four, eight or twelve optical fibers, by arranging these fibers in a plane and fixing them with a binder to produce a ribbon structure with a rectangular cross section. The binder for preparing the optical fiber ribbon from several optical fibers is called a ribbon matrix material. A multiple core ribbon structure consisting of several optical fiber ribbons is also known. The material for binding the optical fiber ribbons is called a bundling material.

The characteristics required for curable resins used as the coating materials for optical fibers include: to be a liquid at ordinary temperature and have a sufficient low viscosity to be excellently coated; to have superior storage stability producing little unevenness in the composition distribution; to provide good productivity at a high curing rate; to have sufficient strength and superior flexibility; to exhibit very little physical change during temperature changes over a wide range; to have superior heat resistance and superior resistance to hydrolysis; to show superior long term reliability with little physical changes over time; to show superior resistance to chemicals such as acids and alkalis; to exhibit low moisture and water absorption; to exhibit superior light resistance; to exhibit high resistance to oils; to produce little hydrogen gas which adversely affects optical fiber characteristics; to produce cured products with slippery surface.

In addition, in the manufacture of optical fiber ribbons and multiple core optical fiber ribbons it is important that the ribbons manufactured are smoothly wound up and the wound ribbons can be smoothly drawn out at a specific rate to smoothly manufacture optical fiber cables in the succeeding step. Conventionally, a lubricant such as silicone oil or a powder such as talc has been applied to the surface of the ribbon to provide slippery surface, whereby smooth wind-up and draw-out operations of the optical fiber ribbons are ensured.

Another method to provide good surface slip characteristics is a method of adding an additive such as silicone oil to the ribbon matrix material or the bundling material. The use of conventional additives, however, impairs the storage stability of the composition, that is, the addition of a large amount of additives causes the liquid composition to be separated into two layers during storage, although the surface slip characteristics of the cured product are improved. If the amount of such an additive to be added is too small, it is necessary to apply a powder such as talc when ribbons are produced, because the cured product does not have sufficient surface slip characteristics, even though the storage stability is excellent.

A ribbon matrix material or a bundling material which can produce optical fiber ribbons without applying a lubricant such as silicone oil or a powder such as talc to the surface of the ribbons is strongly desired. The capability of producing cured product with slippery surface is an important characteristic for the tape material or the bundling material.

In addition, the liquid curable resin composition must not produce liquid-liquid phase separation and must be homogeneous after having been stored for a long period of time, and the cured product must maintain the same characteristics as possessed at the time of production, even when the additive for the improvement of surface property is added.

SUMMARY OF THE INVENTION

An object of the present invention is therefore to provide a liquid radiation curable resin composition having excellent shelf life, producing cured products with slippery surface, and being suitable for use as a coating material for optical fibers, especially as a ribbon matrix material or bundling material.

Another object of the present invention is to provide ribbons or bundled ribbon structures having a cured matrix material or bundling material with appropriate surface characteristics.

This object of the present invention can be solved by the present invention by a liquid radiation curable resin composition comprising a polydimethylsiloxane compound which has (i) at least two urethane bonds in one molecule, (ii) an unreactive organic group at at least one of the ends of the molecule, and (iii) a radical curable ethylenically unsaturated group at the other end of the molecule.

The present invention furthermore relates to a ribbon structure comprising a plurality of coated optical fibers and a matrix material as covering layer, the matrix being a radiation cured layer of a liquid curable resin composition comprising a polydimethylsiloxane compound which has (i) at least two urethane bonds in one molecule, (ii) an unreactive organic group at at least one of the ends of the molecule, and (iii) a radical curable ethylenically unsaturated group at the other end of the molecule.

The present invention furthermore relates to a bundled ribbon structure, comprising a plurality of ribbons, each ribbon comprising a plurality of coated optical fibers and a cured matrix material that cover the plurality of coated optical fibers, the plurality of ribbons being bonded together by a radiation cured bundling material, the bundling material being a liquid curable resin composition comprising a polydimethylsiloxane compound which has (i) at least two urethane bonds in one molecule, (ii) an unreactive organic group at at least one of the ends of the molecule, and (iii) a radical curable ethylenically unsaturated group at the other end of the molecule.

DETAIL DESCRIPTION OF THE INVENTION AND PREFERRED EMBODIMENTS

As defined above the polydimethylsiloxane in the present invention has at least two urethane bonds in one molecule and a radically curable ethylenically unsaturated group at at least one of the ends of the molecule. The at least two urethane bonds is necessary to improve the mutual solubility of the polydimethylsiloxane with other components and to increase the storage stability of the liquid curable resin composition.

The urethane bond can be produced by reacting a polyisocyanate, a reactive silicone compound having a hydroxyl group at at least one end which is later discussed, and said unsaturated group having a hydroxyl group. A di-isocyanate leads to the existance of two urethane bonds in a molecule.

The polyisocyanate which can be used in the present invention include diisocyanates, such as 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexyl)-isocyanate, 2,2,4-trimethylhexamethylene diisocyanate, bis(2-isocyanate-ethyl) fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate, and 2,5(or 6)-bis(isocyanatemethyl)-bicyclo[2.2.1]heptane. Among these diisocyanates, 2,4-tolylene diisocyanate, isophorone diisocyanate, xylylene diisocyanate, and methylenebis-(4-cyclohexylisocyanate) are particularly preferred. These diisocyanate compounds are used either individually or in combination of two or more.

The polydimethylsiloxane structure in the polydimethylsiloxane compound used in the present invention can be introduced using a silicone compound which has a group with an active hydrogen at at least one end and a unreactive organic group at at least one end of the molecule.

Examples of groups with an active hydrogen, this is, a group that can react with an isocyanate, are hydroxyl, mercapto, amine and the like. Of these, a hydroxyl group is preferred.

As examples of such a silicone compound are silicone compounds having a hydroxyl group at one end of the molecule, e.g., a compound having an organic group, such as 3-(2'-hydroxyethoxy)propyl group, 3-(2',3'-dihydroxypropyloxy)propyl group, 3-(2'-ethyl-2'-hydroxymethyl-3-hydroxy)propyl group, or 3-(2'-hydroxy-3'-isopropylamino)propyl group at one end. The silicone compound has an unreactive organic group such as trimethylsilyloxy group at another end. The term "unreactive" as used herein means that the polysiloxane has on one end of the molecule no groups that are radiation curable, nor are hydrolysable nor are reactive with the other components of the coating composition under the conditions by which the composition is prepared and cured. Examples of unreactive groups are alkyl or aryl, such as methyl, ethyl, propyl or phenyl. Generally, the unreactive group will have less than 20 carbon atoms.

These polydimethylsiloxane compounds can be used either individually or in combination of two or more.

The silicone compounds having a hydroxyl group at one end of the molecule are commercially available under the trademarks of, for example, Silaplane FM-0411, FM-0421, FM-0425, FM-D411, FM-D421, and FM-D425 (Chisso Corp.), TSL9105 (Toshiba Silicone Co.), Sin-Etsu Silicone X-22-170A, X-22-170B, X-22-170D, X-22-176B, X-22-176D, X-22-176DX, X-22-178A, and X-22-178B (Shin-Etsu Chemical Co.).

The radical curable ethylenically unsaturated group is necessary to provide the polydimethylsiloxane compound used in the present invention with curability by radiation. This unsaturated group can be introduced by reacting an unsaturated compound having a hydroxyl group and a polyisocyanate compound.

Given as examples of the ethylenically unsaturated compound having a hydroxyl group that can be used in the present invention are acrylate, methacrylate, vinylether, maleate or fumarate groups comprising compounds. Acrylate or methacrylates are preferred.

Suitable examples are 2-hydroxyethylbutyl maleate, 2-hydroxypropylethylfumarate, 1-hydroxybutyl-(vinyl) ether, 1-hydroxypropylvinylether, 2-hydroxyethyl (meth) acrylate, 2-hydroxypropyl (meth)acrylate, 2-hydroxybutyl (meth)acrylate, 2-hydroxy-3-phenyloxypropyl (meth) acrylate, 1,4-butanediol mono(meth)acrylate, 2-hydroxyalkyl(meth)acryloyl phosphate, 4-hydroxycyclohexyl (meth)acrylate, 1,6-hexanediol mono (meth)acrylate, neopentyl glycol mono(meth)acrylate, trimethylolpropane di(meth)acrylate, trimethylolethane di(meth) acrylate, pentaerythritol tri(meth)acrylate, dipentaerythritol penta(meth)acrylate, (meth)acrylates represented by the following structural formulas, $$CH_2=C(R^1)-COOCH_2CH_2-(OCOCH_2CH_2CH_2CH_2CH_2)_n-OH$$

$$CH_2=C(R^1)-COOCH_2CH_2(OH)CH_2-O-(C_6H_5)$$

wherein $R^1$ is a hydrogen atom or a methyl group and n denotes an integer of 1–15. In addition, compounds obtained by an addition reaction between a compound containing a glycidyl group, such as, alkyl glycidyl ether, allyl glycidyl ether, or glycidyl (meth)acrylate, and (meth)acrylic acid can also be used. Among these (meth)acrylates having a hydroxyl group, particularly desirable are 2-hydroxyethyl acrylate and 2-hydroxypropyl acrylate. These (meth) acrylates having a hydroxyl group may be used either individually or in combination of two or more.

The reaction for obtaining the polydimethylsiloxane compound may be carried out, for example, by a method of reacting the silicone compound having a hydroxyl group, the polyisocyante compound, and a (meth)acrylate having a hydroxyl group altogether; a method of reacting the silicone compound having a hydroxyl group and the polyisocyanate compound, and then reacting the resulting product with a (meth)acrylate having a hydroxyl group; a method of reacting the polyisocyanate and a (meth)acrylate having a hydroxyl group, and then reacting the resulting product with the silicone compound having a hydroxyl group. It is desirable that the quantity of the hydroxyl group in the silicone compound and the (meth)acrylate compound is almost equivalent to the isocyanate group in the polyisocyanate compound.

The structure of a polyurethane polyol and the like can be introduced between the polydimethylsiloxane structure and a (meth)acryloyl group by adding a polyol compound to the starting material of the above reactions.

As the polyol used here, polyether diols, polyester diols, polycarbonate diols, polycaprolactone diols, and the like are given. These polyols may be used either individually or in combination of two or more. The manner of polymerization of each constitutional unit in these polyols is not specifically limited and may be random polymerization, block polymerization, or graft polymerization.

Given as specific examples of polyether diols are polyethylene glycol, polypropylene glycol, polytetramethylene glycol, polyhexamethylene glycol, polyheptamethylene glycol, polydecamethylene glycol, and polyether diols obtained by the ring-opening copolymerization of two or more ionic-polymerizable cyclic compounds. Examples of the ionic-polymerizable cyclic compound include cyclic ethers such as ethylene oxide, propylene oxide, butene-1-oxide, isobutene oxide, 3,3'-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidylbenzoate. Specific examples of the polyether diol obtained by the ring-opening copolymerization of two or more types of these ionic-polymerizable cyclic compounds include copolymers obtained by the combination of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, and ethylene oxide and butene-1-oxide; and ternary copolymers obtained by the combination of tetrahydrofuran, ethylene oxide and butene-1-oxide. It is also possible to use a polyether diol obtained by the ring-opening copolymerization of one of the above-mentioned ionic-polymerizable cyclic compounds and a cyclic imine such as ethylene imine, a cyclic lactone such as β-propiolactone and glycolic acid lactide, or a dimethylcyclopolysiloxane. These ring-opening copolymers of ionic-polymerizable cyclic compounds may be either a random copolymer or a block copolymer.

Polyester diols obtained by the reaction of a polyhydric alcohol and a polybasic acid are given as examples of the polyester diol. Ethylene glycol, polyethylene glycol, propylene glycol, polypropylene glycol, tetramethylene glycol, polytetramethylene glycol, 1,6-hexane diol, neopentyl glycol, 1,4-cyclohexane dimethanol, 3-methyl-1,5-pentane diol, 1,9-nonane diol, and 2-methyl-1,8-octane diol, are given as examples of the polyhydric alcohol. As examples of the polybasic acid, phthalic acid, isophthalic acid, terephthalic acid, maleic acid, fumaric acid, adipic acid, and sebacic acid can be given. Commercially available polyester diols which can be used include, for example, Kurapole P-2010, PMIPA, PKA-A, PKA-A2, PNA-2000 (trademarks, manufactured by Kuraray Co.).

A polycarbonate of polytetrahydrofuran and a polycarbonate of 1,6-hexane diol can be given as examples of the polycarbonate diol. The polycarbonate diols can also be commercially available under the trademarks, for example, of DN-980, DN-981, DN-982, DN-983 (Nihon Polyurethane), PC-8000 (PPG of the US), and PC-THF-CD (BASF).

Given as examples of the polycaprolactone diol are polycaprolactone diols obtained by the reaction of ε-caprolactone and a diol. Such a diol may be, for example, ethylene glycol, polyethylene glycol, propylene glycol, polypropylene glycol, tetramethylene glycol, polytetramethylene glycol, 1,2-polybutylene glycol, 1,6-hexane diol, neopentyl glycol, 1,4-cyclohexane dimethanol, and 1,4-butane diol. These polycaprolactone diols can be also commercially available under the trademarks such as PLACCEL 205, 205AL, 212, 212AL, 220, 220AL (Daicell Co., Ltd.).

Other polyol compounds which can be used include dimethylol compounds of ethylene glycol, propylene glycol, 1,4-butane diol, 1,5-pentane diol, 1,6-hexane diol, neopentyl glycol, 1,4-cyclohexane dimethanol, hydrogenated bisphenol A, hydrogenated bisphenol F, or dicyclopentadiene; tricyclodecane dimethanol, pentacyclopentadecane dimethanol, β-methyl-δ-valerolactone, polybutadiene with terminal hydroxyl groups, hydrogenated polybutadiene with terminal hydroxyl groups, castor oil-denatured polyol, polydimethylsiloxane with terminal diols, and polydimethylsiloxane carbitol-denatured polyols.

The molecular weight of these polyols, in terms of the number average molecular weight based on polystyrene standard, is usually about 50–15,000, and preferably about 100–8,000.

The reaction for obtaining the polydimethylsiloxane compound containing a polyol structure may be carried out, for example, by a method of reacting a silicone compound having a hydroxyl group, a polyol compound, a polyisocyanate compound, and a (meth)acrylate having a hydroxyl group altogether; a method of reacting a polyol and a polyisocyanate, and then reacting said silicone compound and a (meth)acrylate compound having a hydroxyl group; a method of reacting the polyisocyanate, said silicone compound, and a (meth)acrylate having a hydroxyl group, and then reacting the resulting product with the polyol compound; a method of reacting the polyisocyanate and said silicone compound, then reacting the polyol compound, and finally reacting a (meth)acrylate having a hydroxyl group; and a method of reacting the polyisocyanate and a (meth)acrylate having a hydroxyl group, then reacting the polyol compound, and finally reacting said silicone compound.

The urethane bond in the polydimethylsiloxane compound used in the present invention is introduced only to one of the terminals of the polydimethylsiloxane structure as mentioned above. If the urethane bond is introduced to all terminals of the polydimethylsiloxane structure, a sufficient surface slip characteristics cannot be obtained.

The polydimethylsiloxane compound used in the present invention has a number average molecular weight reduced to polystyrene of about 800–15,000, preferably about 1,000–7,000. If the number average molecular weight is less than about 800, the cured product produced from the composition may not have a sufficient surface slip characteristics; if the number average molecular weight is more than about 15,000, the cured product produced from the composition may have poor liquid shelf life.

The polydimethylsiloxane compound used in the present invention is contained in the liquid curable composition in an amount preferably of about 0.05–15 wt %, more preferably less than 10 wt. % and particularly preferably about 0.1–7 wt %. If the content of the polydimethylsiloxane compound is less than about 0.05 wt %, the cured product may not have a sufficient surface slip characteristics; if more than about 15 wt %, the cured product may have poor liquid storing stability.

The liquid curable resin composition of the present invention may contain a urethane (meth)acrylate obtained by the reaction of a polyol, a diisocyanate, and a (meth)acrylate containing a hydroxyl group.

Such a urethane (meth)acrylate can be produced by reacting the isocyanate group of the diisocyanate and the hydroxyl group of the polyol and the (meth)acrylate containing a hydroxyl group.

This reaction may be carried out, for example, by a method of reacting the polyol, the diisocyanate, and the (meth)acrylate having a hydroxyl group altogether; a method of reacting the polyol and the diisocyante, and then reacting the resulting product with the (meth)acrylate having a hydroxyl group; a method of reacting the diisocyanate and the (meth)acrylate having a hydroxyl group, and then reacting the resulting product with the polyol; and a method of reacting the diisocyanate and the (meth)acrylate having a hydroxyl group, reacting the resulting product with the polyol, and then again reacting the product thereby obtained with the (meth)acrylate having a hydroxyl group.

The above-mentioned compounds can be used as the polyol, the diisocyanate, and the (meth)acrylate having a hydroxyl group in these reactions.

The polyol, the diisocyanate, and the (meth)acrylate containing a hydroxyl group are used preferably in a proportion such that for one equivalent of the hydroxyl group of the polyol, about 1.1–3 equivalents of the isocyanate group contained in the diisocyanate and about 0.2–1.5 equivalents of the hydroxyl group contained in the (meth)acrylate are used. In addition, it is desirable that the equivalent of the hydroxy groups in the polyol and the (meth)acrylate is almost the same as the equivalent of the isocyanate group in the diisocyanate.

In the reaction of these compounds, a catalyst for urethane forming reaction such as copper naphthenate, cobalt naphthenate, zinc naphthenate, n-butyl-tin-dilaurylate, triethylamine, 1,4-diazabicyclo[2.2.2]octane, or 2,6,7-trimethyl-1,4-diazabicyclo[2.2.2]octane is used, generally, in an amount of about 0.01 to about 1 part by weight for 100 parts by weight of the reaction raw materials. The reaction temperature is normally in the range of about 10–90° C., preferably of about 30–80° C.

The urethane (meth)acrylate thus obtained is incorporated in the composition in an amount of about 10–90% by weight. The amount of about 20–70% by weight is more preferred, especially in the case where excellent coatability to the optical fiber, superior tensile break strength and tensile elongation at break of the coated material after cure, and long-term reliability of the products are desired.

Besides these components, a urethane (meth)acrylate obtained by reacting two mols of urethane (meth)acrylate containing a hydroxyl group with one mol of diisocyanate can be incorporated to the liquid curable resin composition of the present invention. Given as examples of such a urethane (meth)acrylate are the reaction product of hydroxyethyl (meth)acrylate and 2,5(or 2,6)-bis-(isocyanatemethyl)-bicyclo[2.2.1]heptane, the reaction product of hydroxyethyl (meth)acrylate and 2,4-tolylene diisocyanate, the reaction product of hydroxyethyl (meth)acrylate and isophorone diisocyanate, the reaction product of hydroxypropyl (meth)acrylate and 2,4-tolylene diisocyanate, and the reaction product of hydroxypropyl (meth)acrylate and isophorone diisocyanate.

In addition to the urethane (meth)acrylate, a polymerizable monomers containing a vinyl group or a (meth)acryloyl group can be added to the liquid curable resin composition of the present invention. Monofunctional monomers and polyfunctional monomers are included in such polymerizable monomers. Given as examples of the monofunctional monomers are monomers containing a vinyl group, such as N-vinyl pyrrolidone, N-vinyl caprolactam, vinyl imidazole, vinyl pyridine; isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth)acrylate, 4-butylcyclohexyl (meth)acrylate, acryloyl morpholine, 2-hydroxyethyl (meth) acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth) acrylate, t-butyl (meth)acrylate, pentyl (meth)acrylate, isoamyl (meth)acrylate, hexyl (meth)acrylate, heptyl (meth) acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth) acrylate, dodecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl (meth)acrylate, phenoxyethyl (meth)acrylate, polyethylene glycol mono (meth)acrylate, polypropylene glycol mono(meth)acrylate, methoxyethylene glycol (meth)acrylate, ethoxyethyl (meth) acrylate, methoxypolyethylene glycol (meth)acrylate, methoxypolypropylene glycol (meth)acrylate, diacetone (meth) acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide, hydroxybutyl vinyl ether, lauryl vinyl ether, cetyl vinyl ether, 2-ethylhexyl vinyl ether; and compounds represented by the following formula (3)

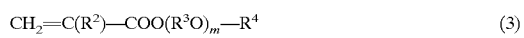

$$CH_2=C(R^2)-COO(R^3O)_m-R^4 \qquad (3)$$

wherein $R^2$ is a hydrogen atom or a methyl group; $R^3$ is an alkylene group containing 2 to 8, preferably 2 to 5 carbon atoms; and m is an integer from 0 to 12, and preferably from 1 to 8; $R^4$ is a hydrogen atom or an alkyl group containing 1 to 12, preferably 1 to 9, carbon atoms; or, $R^4$ is an alkyl group with 4–20 carbon atoms comprising a tetrahydrofuran group, optionally substituted with alkyl groups with 1–2 carbon atoms; or $R^4$ is an alkyl group with 5–20 carbon atoms comprising a dioxane group, optionally substituted with methyl groups; or $R^4$ is an aromatic group, optionally substituted with a $C_1$–$C_{12}$ alkyl group, preferably a $C_8$–$C_9$ alkyl group.

Commercially available monofunctional compounds include ARONIX M111, M113, M114, M117 (Toagosei Chemical Industry Co., Ltd.), KAYARAD TC110S, R629, R644 (Nippon Kayaku Co., Ltd.), and Viscoat 3700 (Osaka Organic Chemical Industry, Ltd.).

Examples of the polyfunctional monomers include monomers containing (meth)acryloyl group such as trimethylolpropane tri(meth)acrylate, pentaerythritol (meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth) acrylate, neopentyl glycol di(meth)acrylate, trimethylolpropanetrioxyethyl (meth)acrylate, tris(2-hydroxyethyl) isocyanurate tri(meth)acrylate, tris(2-hydroxyethyl) isocyanurate di(meth)acrylate, tricyclodecanediyldimethyl di(meth)acrylate, and di(meth)acrylate of a diol which is an ethylene oxide or propylene oxide adduct to bisphenol A, di(meth)acrylate of a diol which is an ethylene oxide or propylene oxide adduct to hydrogenated bisphenol A, epoxy (meth)acrylate which is a (meth)acrylate adduct to bisphenol A of diglycidyl ether, diacrylate of polyoxyalkylated busphenol A, and triethylene glycol divinyl ether. Given as commercially available polyfunctional monomers are YUPIMER-UV, SA1002, SA2007 (Mitsubishi Chemical Co., Ltd.), Viscoat 700 (Osaka Organic Chemical Industry Ltd.), KAYARAD R-604, DPCA-20, DPCA-30, DPCA-60, DPCA-120, HX-620, D-310, D-330, (Nippon Kayaku Co., Ltd.), and ARONIX M-210, M-215, M-315, M-325 (Toagosei Chemical Industry Co., Ltd.). Among these polyfunctional monomers, tricyclodecanediyldimethyl di(meth) acrylate and diacrylate of polyoxyalkylated bisphenol A are particularly preferred.

These polymerizable monomers are preferably added to the composition in an amount of less than about 80 wt %, and particularly preferably about 20–70 wt %. If this amount is more than about 80 wt %, the curing speed may be slow.

The liquid curable resin composition of the present invention can be cured by radiation. The radiation here means radiations such as visible light, ultraviolet light or electron beams.

The liquid curable resin composition of the present invention can be used with a photopolymerization initiator added to it.

When the liquid curable resin composition of the present invention is cured by UV or visible light radiation, a radiation polymerization initiator is used. As required, a photosensitizer is added. Here, examples of the radiation polymerization initiator include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-on e, 2,4,6-trimethylbenzoyldiphenyl-phosphine oxide, and bis(2,6-dimethoxybenzoyl)-2,4,4-trimethylpentylphosphine oxide; and commercially available products, such as Irgacure 184, 369, 651, 500, 907, CGI1700, CGI1750, CGI1850, CG24-61 (Ciba Geigy), Lucirin LR8728 (BASF), Darocure 1116, 1173 (Merck Co.), and Uvecryl P36 (UCB). Given as examples of the photo-sensitizers are triethylamine, diethylamine, N-methyldiethanolamine, ethanolamine, 4-dimethylaminobenzoic acid, methyl 4-dimethylaminobenzoate, ethyl 4-dimethylaminobenzoate, isoamyl 4-dimethylaminobenzoate, and commercially available products such as Uvecryl P102, P103, P104, and P105 (manufactured by UCB Co).

Beside the above components, the liquid curable resin composition of the present invention may be formulated with other curable oligomers or polymers to the extent that the effect of the present invention is not adversely affected.

Included in the examples of the other curable oligomers or polymers are polyester (meth)acrylates, epoxy (meth)acrylates, polyamide (meth)acrylates, siloxane polymers having a (meth)acryloyloxy group, and reactive polymers which are obtained by the reaction of acrylic acid and a copolymer of glycidyl (meth)acrylate and other polymerizable monomer.

Furthermore, amines may be added to the liquid curable resin composition of the present invention to suppress generation of hydrogen gas which causes a transmission loss of optical fibers. The diamines which can be added include diarylamine, diisopropylamine, diethylamine and diethylhexylamine.

Beside these, various additives may be added as required, such as antioxidants, UV absorbers, photo-stabilizers, silane coupling agents, thermal polymerization inhibitors, leveling agents, coating surface improvers, heat polymerization inhibitors, leveling agents, surfactants, coloring matters, preservatives, plasticizers, lubricants, solvents, fillers, anti-oxidant, and wettability improvers. Commercially available antioxidants which can be used are Irganox 1010, 1035, 1076, 1222 (Ciba Geigy), Antigen P, 3C, FR, GA-80 (Sumitomo Chemical Industries Co., Ltd.), and the like. As UV absorbers, Tinuvin P, 234, 320, 326, 327, 328, 329, 213 (Ciba Geigy), Seesorb 102, 103, 110, 501, 202, 712, 704 (manufactured by Sypro Chemical Co.) can be given. Commercially available photo-stabilizers which can be added include Tinuvin 292, 144, 622LD (manufactured by Ciba Geigy), Sanol LS770 (manufactured by Sankyo Chemical Co.), and SUMISORB TM-061 (manufactured by Sumitomo Chemical Industries). Examples of silane coupling agents which can be given are γ-aminopropyltriethoxy silane, γ-mercaptopropyltrimethoxy silane, γ-methacryloxypropyl-trimethoxy silane, and commercial products such as SH6062, SH6030 (Toray Silicone Co.) and KBE903, KBE603, KBE403 (Shin-etsu Chemical Co.). As the leveling agent, silicone additives such as dimethylsiloxane polyether and commercially available products, such as DC-57, DC-190 (Dow Corning), SH-28PA, SH-29PA, SH-30PA, SH-190 (Toray-Dow Corning), KF351, KF352, KF353, KF354 (Shin-Etsu Chemical Industries), and L-700, L-7002, L-7500, FK-024-90 (Nippon Uniker), can be given as examples.

The viscosity of the liquid curable resin composition of the present invention is normally in the range of about 200 to about 20,000 cp at 25° C., and preferably about 2,000 to about 15,000 cp at 25° C.

Ribbon structures can be made by having a plurality of coated optical fibers drawn side by side through a bath of liquid resin composition, often using a die, and curing the thin layer of matrix resin with e.g. UV light. Generally 2, 4, 8 or 12 optical fibers are bonded together in a ribbon. Generally, each optical fiber has a different color, which has been applied either by using a colored secondary coating, or by applying a UV-curable ink layer. Drawing speeds generally are between 1–30 m/s.

Bundled ribbon structures can be made by drawing a plurality of ribbons, generally either in a parallel or stacked configuration, through a bath of liquid resin composition, often using a die, and curing the thin layer of bundling material with e.g. UV light. Generally, between 2 and 30 ribbons are bundled in this way. Preferably, between 2 and 12 ribbons are bonded. Drawing speeds generally are between 1–20 m/s.

As UV light source, for example a Fusion D-bulb can be used; the intensity of the light applied generally is between about 0.2–2 $J/cm^2$, preferably between about 0.5–1 $J/cm^2$.

When the composition is used as a ribbon matrix material or a bundling material for optical fibers, the Young's modulus of the composition after cure is normally about 10–250 $kg/mm^2$, and preferably about 40–150 $kg/mm^2$.

It is desirable that the liquid curable resin composition in the cured state has surface slip characteristics of about 0.1–1.5 $kg/cm^2$, particularly about 0.1–1.0 $kg/cm^2$. If the surface slip characteristics is more than about 1.5 $kg/cm^2$, optical fiber ribbons cannot be drawn at a specific constant speed when optical fiber cables are manufactured; if less than about 0.1 $kg/cm^2$, the surface of optical fiber ribbons is too slippery to be orderly wound.

The present invention will be hereinafter described in more detail by way of examples which are given for illustration of the present invention shall not to be construed as limiting the present invention. In the examples hereinafter "part(s) by weight" is simply described as "part(s)".

EXAMPLES

Synthesis of polydimethyl siloxane compound (SA-1)

2.8 parts of tolylene diisocyanate, 95.4 parts of α-[3-(2'-hydroxyethoxy)propyl]-ω-trimethylsilyloxy polydimethylsiloxane with a hydroxy group equivalent of 6,000, and 0.02 part of 2,6-di-t-butyl-p-cresol, as a polymerization inhibitor, were charged into a reaction vessel equipped with a stirrer. The mixture was cooled with ice to a temperature of below 10° C. while stirring, at which temperature 0.08 part of dibutyl tin dilaurate was added. Then, the mixture was stirred for one hour while controlling the temperature at 20–30° C., and for two hours at 40–50° C. After the addition of 1.8 parts of hydroxyethyl acrylate, the mixture was stirred for a further three hours while controlling the temperature at 50–60° C. The reaction was terminated when the amount of the residual isocyanate group is reduced to 0.1 wt % or less. The number average molecular weight of the resulting polydimethylsiloxane (reduced to polystyrene, measured by gel permeation method using AS-8020(tm) manufactured by Tosoh Corp., hereinafter the same) was 6,100. The polydimethylsiloxane resin liquid obtained is designated as SA-1.

Synthesis of polydimethyl siloxane compound (SA-2)

16.6 parts of isophorone diisocyanate, 0.08 part of dibutyl tin dilaurate, and 0.02 part of 2,6-di-t-butyl-p-cresol were charged into a reaction vessel equipped with a stirrer, and the mixture was cooled to a temperature of below 15° C. 8.7 parts of hydroxyethyl acrylate was added dropwise while stirring and controlling the temperature below 30° C. After the addition, the mixture was reacted for one hour at 30° C. Then, 74.7 parts of α-[3-(2'-hydroxyethoxy)propyl]-ω-trimethylsilyloxy polydimethylsiloxane with a hydroxy group equivalent of 1,000 was added and the mixture was stirred at 20–55° C. The reaction was terminated when the amount of the residual isocyanate group is reduced to 0.1 wt % or less. The number average molecular weight of the resulting polydimethylsiloxane was 1,400. The polydimethylsiloxane resin liquid obtained is designated as SA-2.

Synthesis of polydimethyl siloxane compound (SA-3)

15.3 parts of tolylene diisocyanate, 74.6 parts of α-[3-(2',3'-dihydroxypropyloxy)propyl]-ω-trimethylsilyloxy polydimethylsiloxane with a hydroxy group equivalent of 850, and 0.02 part of 2,6-di-t-butyl-p-cresol, as a polymerization inhibitor, were charged into a reaction vessel equipped with a stirrer. The mixture was cooled with ice to a temperature of below 10° C. while stirring, at which temperature 0.08 part of dibutyl tin dilaurate was added. Then, the mixture was stirred for one hour while controlling the temperature at 20–30° C., and for two hours at 40–50° C. After the addition of 10.2 parts of hydroxyethyl acrylate, the mixture was stirred for a futher three hours while controlling the temperature at 50–60° C. The reaction was terminated when the amount of the residual isocyanate group is reduced to 0.1 wt % or less. The number average molecular weight of the resulting polydimethylsiloxane was 1,800. The polydimethylsiloxane resin liquid obtained is designated as SA-3.

Synthesis of polydimethyl siloxane compound (SA-4)

6.2 parts of tolylene diisocyanate, 89.6 parts of α-[3-(2',3'-dihydroxypropyloxy)propyl]-ω-trimethylsilyloxy polydimethylsiloxane with a hydroxy group equivalent of 2,500, and 0.02 part of 2,6-di-t-butyl-p-cresol were charged into a reaction vessel equipped with a stirrer. The mixture was cooled with ice to a temperature of below 10° C. while stirring, at which temperature 0.08 part of dibutyl tin dilaurate was added. Then, the mixture was stirred for one hour while controlling the temperature at 20–30° C., and for two hours at 40–50° C. After the addition of 4.2 parts of hydroxyethyl acrylate, the mixture was stirred for a further three hours while controlling the temperature at 50–60° C. The reaction was terminated when the amount of the residual isocyanate group is reduced to 0.1 wt % or less. The number average molecular weight of the resulting polydimethylsiloxane was 5,200. The polydimethylsiloxane resin liquid obtained is designated as SA-4.

Synthesis of polydimethyl siloxane compound (SA-5)

22.8 parts of tolylene diisocyanate, 65.5 parts of α-[3-(2'-hydroxyethoxy)propyl]-ω-trimethylsilyloxy polydimethylsiloxane with a hydroxy group equivalent of 1,000, and 0.02 part of 2,6-di-t-butyl-p-cresol were charged into a reaction vessel equipped with a stirrer. The mixture was cooled with ice to a temperature of below 10° C. while stirring, at which temperature 0.08 part of dibutyl tin dilaurate was added. Then, the mixture was stirred for two hours while controlling the temperature at 20–30° C., and for one hour at 40–50° C. After the addition of 4.1 parts of ethylene glycol, the mixture was stirred for half an hour at 20–30° C. and for one hour at 40–50° C. Then, 7.6 parts of hydroxyethyl acrylate was added and the mixture was stirred for two hours at 50–60° C. The reaction was terminated when the amount of the residual isocyanate group is reduced to 0.1 wt % or less. The number average molecular weight of the resulting polydimethylsiloxane was 1,800. The polydimethylsiloxane resin liquid obtained is designated as SA-5.

Synthesis of urethane acrylate (UA-1)

14 parts by weight of 2,4-tolylene diisocyanate, 0.08 part by weight of dibutyl tin dilaurate, 0.02 part by weight of 2,6-di-tert-butyl cresol, 7.7 parts by weight of N-vinylpyrrolidone, and 15.5 parts by weight of tricyclodecanediyl-dimethyl diacrylate were charged to a reaction vessel equipped with a stirrer and the mixture was cooled to 5–10° C. After the addition of 5.8 parts by weight of hydroxyethyl acrylate dropwise while controlling temperature below 10° C., the mixture was reacted for one hour at 30° C. Then, 1.7 parts by weight of ethylene glycol and 54.7 parts by weight of polytetramethylene glycol having a number average molecular weight of 2,000 were added and the mixture was stirred for two hours at 30–50° C. After the further addition of 0.5 part by weight of hydroxyethyl acrylate, the reaction was continued at 50–60° C. until the amount of residual isocyanate group was reduced to 0.1 wt % or less. The urethane acrylate obtained is designated as UA-1.

Synthesis of urethane acrylate (UA-2)

6.3 parts by weight of tolylene diisocyanate, 0.01 part by weight of dibutyl tin dilaurate, 0.009 part by weight of 2,6-di-tert-butyl cresol, and 16 parts by weight of isobornyl acrylate were charged to a reaction vessel equipped with a stirrer and the mixture was cooled to 5–10° C. After the addition of 8.4 parts by weight of hydroxyethyl acrylate dropwise while controlling temperature below 40° C., the mixture was reacted for one hour at 45–55° C. The reaction was terminated when the residual isocyanate group was reduced to 0.1 wt %. To the reaction mixture were added 2.6 parts by weight of N-vinylpyrrolidone, 6.8 parts by weight of tricyclodecanediyldimethyl diacrylate, 0.3 part by weight of 2,2'-thio-diethylenebis[3-(3,5-di-t-butyl-4-hydroxyphenyl)]propionate, 56 parts by weight of UA-1, and 0.1 part by weight of diethylamine. This mixture was stirred at 40–50° C. to obtain a transparent, homogeneous liquid, which is designated as UA-2.

<Preparation of comparative compound; polydimethylsiloxane compound with reactive both terminals (RA-1)>

A 22 parts of tolylene diisocyanate, 63.3 parts of α,ω-bis [3-(2'-hydroxyethoxy)propyl]polydimethylsiloxane with a hydroxy group equivalent of 500, and 0.02 part of 2,6-di-t-butyl-p-cresol were charged into a reaction vessel equipped with a stirrer. The mixture was cooled with ice to a temperature of below 10° C. while stirring, at which temperature 0.08 part of dibutyl tin dilaurate was added. Then, the mixture was stirred for one hour while controlling the temperature at 20–30° C., and for two hours at 40–50°

C. After the addition of 14.7 parts of hydroxyethyl acrylate, the mixture was stirred for a further three hours at 50–60° C. The reaction was terminated when the amount of the residual isocyanate group is reduced to 0.1 wt % or less. The number average molecular weight of the resulting polydimethylsiloxane was 1,500. The polydimethylsiloxane resin liquid obtained is designated as RA-1.

EXAMPLES 1–8

COMPARATIVE EXAMPLES 1–3

<Preparation of a liquid curable resin composition>

The components shown in Tables 1 and 2 were charged into a reaction vessel equipped with a stirrer. The mixture was stirred for 3 hours while controlling the temperature at 50–60° C. to prepare liquid curable resin compositions.

TABLE 1

| Component (part by weight) | Example 1 | Example 2 | Example 3 | Example 4 | Example 5 | Example 6 | Example 7 | Example 8 |
|---|---|---|---|---|---|---|---|---|
| SA-1 | 0.1 | 0 | 0 | 0 | 0.5 | 1.0 | 0 | 0 |
| SA-2 | 0 | 1.0 | 0 | 0 | 0 | 1.0 | 0 | 0 |
| SA-3 | 0 | 0 | 3.0 | 0 | 0 | 0 | 0 | 0 |
| SA-4 | 0 | 0 | 0 | 1.0 | 1.0 | 0 | 0 | 0 |
| SA-5 | 0 | 0 | 0 | 0 | 0 | 0 | 3.0 | 10 |
| UA-2 | 98.3 | 95.9 | 94.0 | 97.4 | 97.0 | 96.5 | 95.0 | 88.5 |
| Photoinitiator (a) | 0 | 0 | 0 | 1.5 | 0 | 0 | 1.5 | 1.5 |
| Photoinitiator (b) | 1.5 | 0 | 0 | 0 | 1.5 | 1.5 | 0 | 0 |
| Photoinitiator (c) | 0 | 3.0 | 3.0 | 0 | 0 | 0 | 0 | 0 |
| Coating surface improver (d) | 0.1 | 0.1 | 0 | 0.1 | 0 | 0 | 0.5 | 0 |

(a) 2,4,6-Trimethyibenzoyldiphenylphosphine oxide
(b) A mixture of bis(2,6-dimethoxybenzoyl)-2,4,4-trimethylpentylphosphine oxide and 1-hydroxycyclohexyl phenyl ketone (weight ratio: 50:50)
(c) 1-Hydroxycyclohexyl phenyl ketone
(d) Graft polymer of dimethylsiloxane polycarbinol

TABLE 2

| Component (part by weight) | Comparative Example 1 | Comparative Example 2 | Comparative Example 3 |
|---|---|---|---|
| SA-1 | 0 | 0 | 0 |
| SA-2 | 0 | 0 | 0 |
| RA-1 | 0 | 0 | 5.0 |
| UA-2 | 98.5 | 97.0 | 92.0 |
| Photoinitiator (a) | 0 | 0 | 0 |
| Photoinitiator (b) | 1.5 | 0 | 1.5 |
| Photoinitiator (c) | 0 | 3.0 | 0 |
| Coating surface improver (d) | 0 | 0 | 1.5 |

TEST EXAMPLES

The liquid curable resin composition was cured to produce test leaves by the method described below. The test leaves were subjected to evaluation according to the following methods.

1. Preparation of test leaves

The liquid curable resin composition was applied to glass plates using an applicator bar with a thickness of 250 μm and irradiated with UV light at 0.5 J/cm² under nitrogen atmosphere. The cured films were aged at 23° C. and 50% RH for over 12 hours, removed from the glass plate, cut into strips with a width of 3 cm, and secured onto an aluminum plate using a double coated adhesive tape with the irradiated surface facing upside. Two such test leaves were layered with the cured surface being face by face, secured with a double clip, and served to a surface friction force test.

2. Surface friction force test

A surface performance test was carried out at a rate of pulling of 50 mm/min, a surface contact area of the cured film of 5.4 cm², and pressure of 0.48 kg/cm² by the double clip. The shear slip stress (kg/cm2) was calculated from the load at the initiation of slip.

3. Measurement shelf life of the resin composition

To evaluate the shelf life, the liquid curable resin composition was allowed to stand at 60° C. for 30 days, following which the liquid resin was dropped onto a glass plate to macroscopically observe separation of resin components on the surface of the liquid.

4. Measurement of viscosity

Viscosity of the liquid curable resin compositions was measured at 25° C. using a B-type viscometer manufactured by Tokyo Keiki Co., Ltd. The results are shown in Table 3.

TABLE 3

| | Surface slip characteristic (kg/cm²) | Storage stability of the liquid[1] | Viscosity (cps @ 25° C.) |
|---|---|---|---|
| Example 1 | 0.5 | 0 | 7900 |
| Example 2 | 0.4 | 0 | 7000 |
| Example 3 | 0.3 | 0 | 8400 |
| Example 4 | 0.2 | 0 | 7000 |
| Example 5 | 0.3 | 0 | 8400 |
| Example 6 | 0.2 | 0 | 8000 |
| Example 7 | 0.3 | 0 | 9200 |
| Example 8 | 0.2 | 0 | 11000 |
| Comparative Example 1 | >9 | 0 | 8000 |
| Comparative Example 2 | >9 | 0 | 8000 |
| Comparative Example 3 | 2.6 | X | 8300 |

0: Stability was good
X: Separation of resin components was observed on the liquid surface.

As fully illustrated above, the liquid curable resin composition of the present invention exhibits superior shelf life in a liquid state and, after cured, has slippery surface. The resin composition is therefore particularly suitable as a coating material for optical fibers, woods, plastic sheets, and the like. When used for the manufacture of optical fiber ribbons, this liquid curable resin composition does not require a lubricant such as silicone oil or talc. When used as a coating material for woods and plastics, excellent surface character and the effect of preventing adherence among the materials used can be expected.

What is claimed is:

1. A liquid radiation curable resin composition comprising a polydimethylsiloxane compound which has (i) at least two urethane bonds in one molecule, (ii) an unreactive organic group at at least one of the ends of the molecule, and (iii) a radical curable ethylenically unsaturated group at the other end of the molecule.

2. The liquid curable resin composition according to claim 1, wherein said polydimethylsiloxane compound has an organic group containing at least two urethane bonds and one or two radical curable ethylenically unsaturated groups at one end, an unreactive organic group terminating the other end, and a number average molecular weight of about 800–15,000, and said liquid curable resin composition containing the polydimethylsiloxane in an amount of about 0.05–15 wt %.

3. A liquid curable resin composition according to claim 1, wherein said radical curable ethylenically unsaturated group is an acrylate or methacrylate group.

4. A liquid curable resin composition according to claim 1, wherein the composition comprises a sufficient amount of said polydimethylsiloxane, that the cured resin has a surface slip characteristic between about 0.1–1.5 kg/cm$^2$.

5. The liquid curable resin composition according to claim 1, wherein said polydimethylsiloxane compound is prepared by reacting a silicone compound having a hydroxyl group at one end, a polyisocyanate compound, and a (meth)acrylate compound having a hydroxyl group.

6. The liquid curable resin composition according to claim 1, wherein said polydimethylsiloxane compound is prepared by reacting a silicone compound having a hydroxyl group at one end, a polyol compound, a polyisocyanate compound, and a (meth)acrylate compound having a hydroxyl group.

7. The liquid curable resin composition according to claim 5, wherein said silicone compound having a reactive hydroxyl group at one end is a polydimethylsiloxane which has a 3-(2'-hydroxyethoxy)propyl group or a 3-(2',3'-dihydroxypropyloxy)propyl group at one end and of which the other end is terminated with a trimethylsilyloxy group.

8. The liquid curable resin composition according to claim 1, further comprising a urethane (meth)acrylate compound prepared from a polyol, a diisocyanate, and a (meth)acrylate having a hydroxyl group.

9. The liquid curable resin composition according to claim 8 containing said urethane (meth)acrylate compound in an amount of about 90 wt % or less.

10. The liquid curable resin composition according to claim 8, further comprising a monofunctional or polyfunctional polymerizable monomer which contains a (meth)acryloyl group or a vinyl group.

11. The liquid curable resin composition according to claim 10 containing said monofunctional or polyfunctional polymerizable monomer in an amount of about 80 wt % or less.

12. Ribbon structure comprising a plurality of coated optical fibers and a matrix material as covering layer, the matrix being a radiation cured layer of a liquid curable resin composition comprising a polydimethylsiloxane compound which has (i) at least two urethane bonds in one molecule, (ii) an unreactive organic group at at least one of the ends of the molecule, and (iii) a radical curable ethylenically unsaturated group at the other end of the molecule.

13. Bundled ribbon structure, comprising a plurality of ribbons, each ribbon comprising a plurality of coated optical fibers and a cured matrix material that cover the plurality of coated optical fibers, the plurality of ribbons being bonded together by a radiation cured bundling material, the bundling material being a liquid curable resin composition comprising a polydimethylsiloxane compound which has (i) at least two urethane bonds in one molecule, (ii) an unreactive organic group at at least one of the ends of the molecule, and (iii) a radical curable ethylenically unsaturated group at the other end of the molecule.

14. Ribbon structure comprising a plurality of coated optical fibers and a matrix material as covering layer, the matrix being a radiation cured layer of a liquid curable resin composition according to claim 1.

15. Bundled ribbon structure, comprising a plurality of ribbons, each ribbon comprising a plurality of coated optical fibers and a cured matrix material that cover the plurality of coated optical fibers, the plurality of ribbons being bonded together by a radiation cured bundling material, the bundling material being a liquid curable resin composition according to any one of claim 1.

16. The liquid curable resin composition according to claim 6, wherein s a i d silicone compound having a reactive hydroxyl group at one end is a polydimethylsiloxane which has a 3-(2'-hydroxyethoxy)propyl group or a 3-(2',3'-dihydroxypropyloxy)propyl group at one end and of which the other end is terminated with a trimethylsilyloxy group.

* * * * *